US009288768B2

(12) United States Patent
Uchida et al.

(10) Patent No.: US 9,288,768 B2
(45) Date of Patent: *Mar. 15, 2016

(54) MOBILE COMMUNICATION SYSTEM

(75) Inventors: Yoshinori Uchida, Tokyo (JP);
Kuniyuki Suzuki, Tokyo (JP)

(73) Assignee: BlackBerrry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/367,682

(22) Filed: Feb. 7, 2012

(65) Prior Publication Data

US 2012/0135742 A1  May 31, 2012

Related U.S. Application Data

(60) Continuation of application No. 11/932,607, filed on Oct. 31, 2007, now Pat. No. 8,140,088, which is a division of application No. 11/113,301, filed on Apr. 25, 2005, now Pat. No. 7,349,368, which is a division (Continued)

(51) Int. Cl.
*H04W 72/00* (2009.01)
*H04W 52/26* (2009.01)
(Continued)

(52) U.S. Cl.
CPC .............. *H04W 52/26* (2013.01); *H04W 28/22* (2013.01); *H04W 52/267* (2013.01); *H04W 52/367* (2013.01); *H04W 56/00* (2013.01); *H04W 88/14* (2013.01)

(58) Field of Classification Search
CPC ..... H04W 28/22; H04W 52/26; H04W 88/14;
H04W 52/367; H04W 56/00; H04W 52/267;
H04W 72/04; H04W 72/0413; H04W 72/06;
H04W 72/08; H04W 88/181; H04W 36/24
USPC .............................. 455/62, 83, 434, 450–451,
455/452.1–452.2, 453, 509, 513, 550.1,
455/556.2, 560–561; 370/230, 232, 235,
370/310, 328–329, 338, 341, 343–344, 458,
370/465
See application file for complete search history.

(56) References Cited

U.S. PATENT DOCUMENTS 4,910,794 A * 3/1990 Mahany ...................... 455/67.14
5,230,082 A   7/1993 Ghisler et al.
(Continued)

FOREIGN PATENT DOCUMENTS

EP   0 584 029   2/1994
EP   0 668 669   8/1995
(Continued)

OTHER PUBLICATIONS

"Administration of Parameter Value Assignments for TAI/EIA Wideband Spread Spectrum Standards," TIA/EIA Telecommunications Systems Bulletin, TSB58, Dec. 1995 (20 pages).
(Continued)

*Primary Examiner* — Meless Zewdu
(74) *Attorney, Agent, or Firm* — Fish & Richardson P.C.

(57) ABSTRACT

In a mobile communication system, a mobile switching center 27 changes a transmission rate of communication data transmitted from a mobile station 16 and so on to a database 11 or a transmission rate of communication data transmitted from the data 11 to the mobile station 16 and so on, on a basis of request from the mobile station 16 and so on or the database 11, individually and independently.

26 Claims, 14 Drawing Sheets

Related U.S. Application Data of application No. 10/829,183, filed on Apr. 22, 2004, now Pat. No. 7,236,792, which is a division of application No. 09/355,880, filed as application No. PCT/JP97/04551 on Dec. 10, 1997, now Pat. No. 6,745,049.

(51) Int. Cl.

| | | |
|---|---|---|
| *H04W 28/22* | (2009.01) | |
| *H04W 52/36* | (2009.01) | |
| *H04W 56/00* | (2009.01) | |
| *H04W 88/14* | (2009.01) | |

(56) References Cited

U.S. PATENT DOCUMENTS

| | | | |
|---|---|---|---|
| 5,327,576 A | | 7/1994 | Uddenfeldt et al. |
| 5,396,516 A | | 3/1995 | Padovani et al. |
| 5,432,790 A | | 7/1995 | Hluchyj et al. |
| 5,448,592 A | * | 9/1995 | Williams et al. ............. 375/261 |
| 5,450,438 A | | 9/1995 | Landry et al. |
| 5,455,823 A | | 10/1995 | Noreen et al. |
| 5,533,004 A | | 7/1996 | Jasper et al. |
| 5,537,410 A | | 7/1996 | Li |
| 5,537,434 A | | 7/1996 | Persson et al. |
| 5,548,806 A | | 8/1996 | Yamaguchi et al. |
| 5,581,548 A | | 12/1996 | Ugland et al. |
| 5,600,636 A | * | 2/1997 | Makelainen et al. ......... 370/296 |
| 5,602,831 A | | 2/1997 | Gaskill et al. |
| 5,719,859 A | | 2/1998 | Kobayashi et al. |
| 5,722,074 A | | 2/1998 | Muszynski |
| 5,740,168 A | | 4/1998 | Nakamura et al. |
| 5,748,624 A | | 5/1998 | Kondo |
| 5,760,702 A | | 6/1998 | Ito et al. |
| 5,781,539 A | | 7/1998 | Tanaka |
| 5,790,551 A | | 8/1998 | Chan |
| 5,805,585 A | * | 9/1998 | Javitt et al. ................... 370/342 |
| 5,848,063 A | | 12/1998 | Weaver, Jr. et al. |
| 5,857,147 A | * | 1/1999 | Gardner .................. G10L 19/22 |
| | | | 370/236 |
| 5,894,473 A | | 4/1999 | Dent |
| 5,898,696 A | | 4/1999 | Proctor et al. |
| 5,907,556 A | * | 5/1999 | Hisanaga et al. ............. 370/468 |
| 5,907,585 A | * | 5/1999 | Suzuki et al. ................. 375/324 |
| 5,914,950 A | | 6/1999 | Tiedemann, Jr. et al. |
| 5,943,616 A | | 8/1999 | Andersson |
| 5,946,104 A | * | 8/1999 | Yoshida ........................ 358/412 |
| 5,963,548 A | | 10/1999 | Virtanen |
| 6,021,116 A | | 2/2000 | Chiussi et al. |
| 6,026,303 A | * | 2/2000 | Minamisawa ................ 455/446 |
| 6,058,104 A | | 5/2000 | Snelling et al. |
| 6,069,883 A | * | 5/2000 | Ejzak et al. ................... 370/335 |
| 6,072,787 A | | 6/2000 | Hamalainen et al. |
| 6,094,428 A | | 7/2000 | Bruckert et al. |
| 6,097,965 A | | 8/2000 | Honkasalo et al. |
| 6,108,548 A | | 8/2000 | Furukawa et al. |
| 6,137,789 A | | 10/2000 | Honkasalo |
| 6,175,550 B1 | * | 1/2001 | van Nee ........................ 370/206 |
| 6,185,736 B1 | * | 2/2001 | Ueno ................................ 725/95 |
| 6,230,017 B1 | * | 5/2001 | Andersson et al. ......... 455/456.6 |
| 6,240,079 B1 | | 5/2001 | Hamalainen et al. |
| 6,510,148 B1 | | 1/2003 | Honkasalo |
| 6,745,049 B1 | | 6/2004 | Uchida et al. |
| 7,236,792 B2 | | 6/2007 | Uchida et al. |
| 7,349,360 B2 | | 3/2008 | Gutierrez et al. |

FOREIGN PATENT DOCUMENTS

| | | |
|---|---|---|
| EP | 0 685 129 | 12/1995 |
| EP | 0 750 440 | 12/1996 |
| EP | 0 887 948 | 12/1998 |
| JP | 7-203116 | 8/1995 |
| JP | 7-297829 | 11/1995 |
| JP | 8-97824 | 4/1996 |
| JP | 8-130766 | 5/1996 |
| JP | 8186533 | 7/1996 |
| JP | 8-274756 | 10/1996 |
| JP | 8275236 | 10/1996 |
| JP | 8331153 | 12/1996 |
| JP | 9-312649 | 12/1997 |
| WO | 95/07578 | 3/1995 |
| WO | 96/36150 | 11/1996 |
| WO | 97/22196 | 6/1997 |
| WO | 97/26739 | 7/1997 |
| WO | 97/29566 | 8/1997 |
| WO | 98/53577 | 11/1998 |

OTHER PUBLICATIONS

"European Digital Cellular Telecommunications System (Phase 2); Mobile Radio Interface Layer 3 Specification (GSM 04.08)" European Telecommunication Standard, ETS 300 557, Oct. 1995, Second Edition (400 pages).

European Digital Cellular Telecommunications System (Phase 2); Physical Layer on the Radio Path General Description (GSM 05.01). European Telecommunication Standard, ETS 300 573, Jul. 1995, Second Edition (19 pages).

"Mobile Station-Base Station Compatibility Standard for Dual-Mode Wideband Spread Spectrum Cellular System," TAI/EIA Interim Standard, TIA/EIA/IS95, Jul. 1993 (668 pages).

"Support for 14.4 kbps Data Rate and PCS Interaction for Wideband Spread Spectrum Cellular Systems," TIA/EIA Telecommunications Systems Bulletin, TSB74, Dec. 1995 (386 pages).

Mouley, M., et al., "Radio Resource Management," GSM System for Mobile Communications, Lassay-Les-Chateaux, Chateaux, Europe Media, FR, 1993, pp. 308-430.

TD SMG 947/97, TS 04 60 V 1.0.0 1997-11, Digital cellular telecommunication system (Phase 2+); General Packet Radio Service (GPRS); Mobile Station (MS)—Base Station System (BSS) interface; Radio Link Control/Medium Access Control (RLC/MAC) protocol (GSM 04.60.v1.0.0), pp. 135.

\* cited by examiner

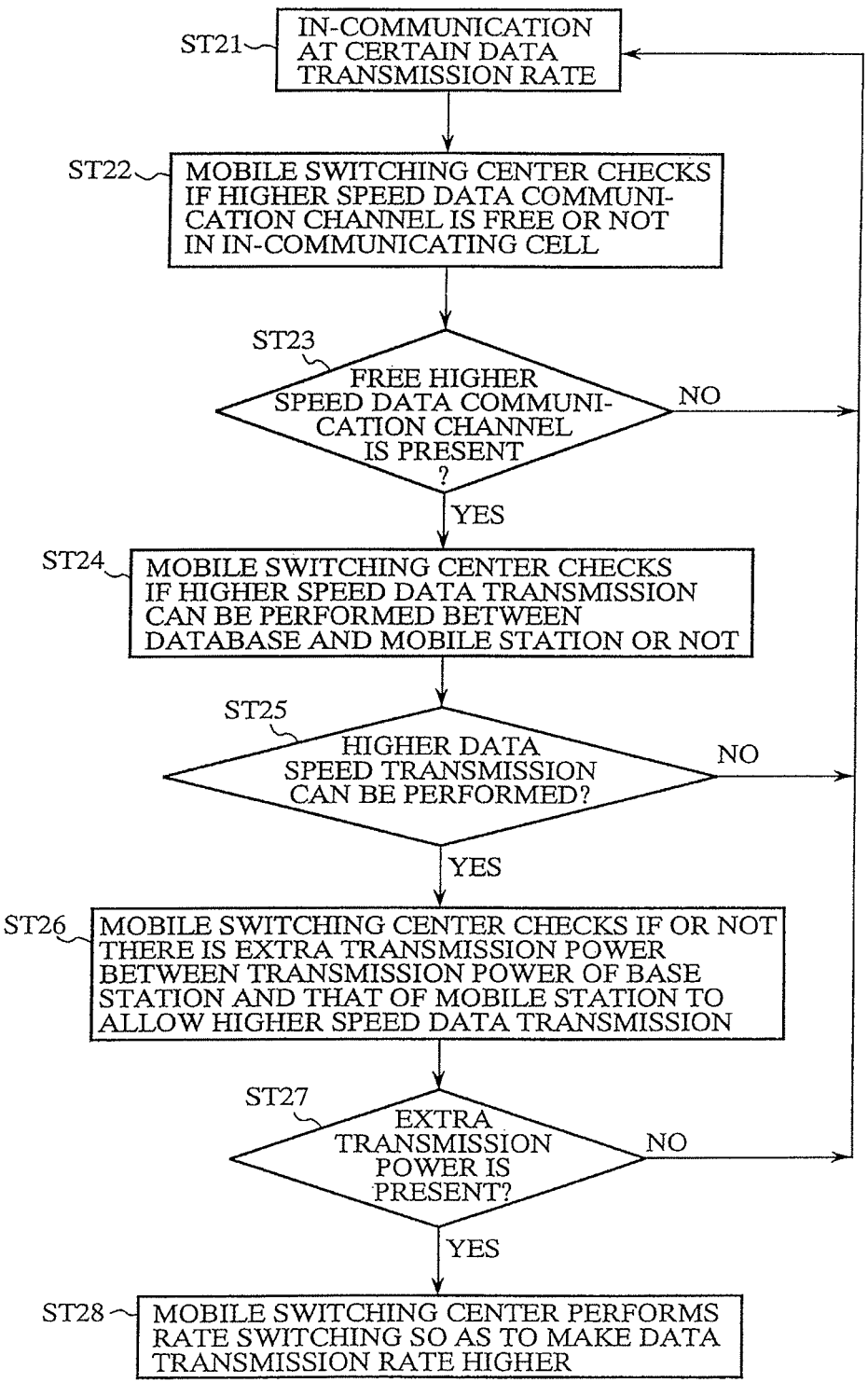

MOBILE COMMUNICATION SYSTEM

CROSS-REFERENCE TO RELATED APPLICATIONS

This application is a continuation of U.S. application Ser. No. 11/932,607, filed Oct. 31, 2007, which is a division of U.S. application Ser. No. 11/113,301, filed Apr. 25, 2005, (now U.S. Pat. No. 7,349,368), which is a division of U.S. application Ser. No. 10/829,183, filed Apr. 22, 2004, (now U.S. Pat. No. 7,236,792), which is a division of U.S. application Ser. No. 09/355,880, filed Aug. 5, 1999, (now U.S. Pat. No. 6,745,049), which is a §371 of PCT/JP97/04551, filed Dec. 10, 1997.

TECHNICAL FIELD

The present invention relates to a mobile communication system which sets an asymmetrical data communication channel in which a transmission rate of communication data transmitted from a mobile station to a base station differs from a transmission rate of communication data transmitted from a base station to a mobile station.

BACKGROUND ART

FIG. 1 is a configuration view illustrating a conventional mobile communication system of Japanese Patent Application Laid-Open Hei 8-331153. In FIG. 1, reference numerals 1, 2, 3 and 4 designate a mobile station installed in a movable car and so on, low speed transmission means for transmitting communication data of a low transmission rate to a base station 5, high speed reception means for receiving communication data of a high transmission rate from a base station 5, and an u-link of a data communication channel, respectively. Reference numerals 5, 6, 7 and 8 designate the base station which radio communicates with the mobile station 1 belonging to a radio covered area, low speed reception means for receiving communication data of a low transmission rate from a mobile station 1, high speed transmission means for transmitting communication data of a high transmission rate, and a down-link of the data communication line.

An operation of this mobile communication system will be described below.

For example, when the mobile station 1 need transmit communication data to a communication apparatus (not shown) connected to a public communication network, the mobile station 1 receives a control channel of the base station 5 and transmits a call through the control channel allocated to the mobile station 1.

That is, the mobile station 1 transmits control information necessary for radio communication to the base station 5 through the control channel (for example, information to the effect that the mobile station 1 transmits communication data to the base station 5 at a low transmission rate, while the mobile station 1 receives communication data from the base station 5 at a high transmission rate).

When the control information is transmitted from the mobile station 1, the base station 5 transfers the control information transmitted from the mobile station 1 to a mobile switching center and so on (not shown). After the mobile switching center and so on allow a request of the mobile station 1, the base station 5 sends information to the effect that the request has been allowed to the mobile station 1 through the control channel.

Thus, the transmission rate of communication data transmitted from the mobile station 1 to the base station 5 is set to a low transmission rate, while the transmission rate of communication data transmitted from the base station 5 to the mobile station 1 is set to a high transmission rate. Therefore, asymmetrical radio communication can be achieved in which the up-link 4 differs from the down-link 8 in the transmission rate.

Since the conventional mobile communication system is formed as described above, the asymmetrical radio communication may be achieved in which the up-link 4 differs from the down-link 18 in the transmission rate. However, means for changing the transmission rate of communication data is not provided. Thus, once the transmission rate of communication data is set, even though a data amount is changed in accordance with passed time, the transmission rate cannot be changed to a transmission rate corresponding to the changed data amount. The conventional mobile communication system has the above-described problem.

The present invention has been made to solve such a problem. It is an object of the present invention to provide a mobile communication system in which after the transmission rate of communication data is set once, the transmission rate of communication data may be changed appropriately.

DISCLOSURE OF THE INVENTION

In a mobile communication system of the present invention, a mobile switching center changes a transmission rate of communication data transmitted from a mobile station to a communication apparatus in accordance with a request from the communication apparatus and so forth connected to the mobile station, a public communication network or the like.

In such way, even though a data amount of communication data transmitted from the mobile station to the communication apparatus varies after the transmission rate of communication data has been set once, the transmission rate may be appropriately changed to a transmission rate corresponding to the changed data amount.

In the mobile communication system of the invention, the mobile switching center changes a transmission rate of communication data transmitted from the communication apparatus to the mobile station in accordance with a request from the mobile station or the communication apparatus.

In such way, even though a data amount of communication data transmitted from the communication apparatus to the mobile station is fluctuated after the transmission rate of communication data has been set once, the transmission rate may be appropriately changed to a transmission rate corresponding to the changed data amount.

In the mobile communication system of the invention, the mobile switching center changes the transmission rate of communication data transmitted from the mobile station to the communication apparatus or communication data transmitted from the communication apparatus to the mobile station individually and independently in accordance with a request from the mobile station or the communication apparatus.

Thus, even though a data amount of communication data transmitted from the mobile station to the communication apparatus or from the communication apparatus to the mobile station is fluctuated after the transmission rate of communication data has been set once, the transmission rate may be appropriately changed to a transmission rate corresponding to the changed data amount.

In a mobile communication system of the invention, the transmission rate changed by the mobile switching center belongs to a range of high speed data transmission.

Thus, when the data amount is markedly large, the transmission time may be shortened.

In a mobile communication system of the invention, the transmission rate of communication data changed by the mobile switching center belongs to a range of medium speed data transmission.

Thus, radio communication corresponding to a data amount may be achieved.

In a mobile communication system of the invention, the, transmission rate of communication data changed by the mobile switching center belongs to a range of low speed data transmission.

Thus, when a data amount is small, radio communication corresponding to the data amount may be achieved.

In a mobile communication system of the invention, the range of the low speed data transmission includes intermittent data transmission.

Thus, a data communication channel may be released in a period in which no communication data are transmitted.

In a mobile communication system of the invention, TDMA/TDD system, TDMA/FDD system, time-divided CDMA/TDD system, time-divided CDMA/FDD system or CDMA/TDD system is used as a transmission system of the high speed data transmission.

Thus, the high speed data transmission may be performed using the above system and so on.

In a mobile communication system of the invention, TDMA/TDD system, TDMA/FDD system, time-divided CDMA/TDD system, time-divided CDMA/FDD system or CDMA/TDD system is used as the medium speed data transmission.

Thus, the medium speed data transmission may be performed using the above system and so on.

In a mobile communication system of the invention, TDMA/TDD system, TDMA/TDD system, time-divided CDMA/TDD system, time-divided CDMA/FDD system or CDMA/TDD system is used as a transmission system of the low speed data transmission.

Thus, the low speed data transmission may be performed using the above system and so on.

In a mobile communication system of the invention, when there are a plurality of mobile stations which transmit/receive communication data through the base station, the mobile switching center is provided with a transition state control processor for managing a transition state of a transmission rate for each of the plurality of mobile stations.

Thus, even though there are the plurality of mobile stations which transmit/receive communication data through the base station, the transmission rate of communication data may be accurately changed.

In a mobile communication system of the invention, the mobile switching center is provided with a priority control processor for managing a setting operation of a data communication channel by the mobile switching center and a changing operation of a transmission rate by the mobile switching center.

Thus, the setting operation and so on of the data communication channel may be surely managed.

In a mobile communication system of the invention, when the mobile station registers a location thereof, the mobile switching center registers the kinds of the transmission rates to be handled by the mobile station and a rate switching time of the mobile station.

Thus, the mobile switching center may change the transmission rate of communication data promptly if necessary.

In a mobile communication system of the invention, the mobile switching center stores the transmission rate to be handled by the mobile station, and is provided with an information memory for storing the rate switching time of the mobile station.

Thus, the mobile switching center may surely grasp the transmission rate and so on to be handled by the mobile station.

In a mobile communication system of the invention, when the mobile station and the communication apparatus start transmission of communication data, the mobile switching center selects the maximum transmission rate allowable by a data communication channel in current use from among transmission rates to be handled by the mobile station and sends transmission rate information on the maximum transmission rate to the base station and the mobile station.

Thus, the transmission time of communication data may be shortened.

In a mobile communication system of the invention, the mobile switching center has sent the information of the transmission rate to the base station and the mobile station, and after the rate switching time of the mobile station stored in the information memory has passed, the mobile switching center sends switching timing information for ordering switching of the transmission rate to the base station and the mobile station.

Thus, the transmission rate may be changed promptly and surely.

In a mobile communication system of the invention, after having received the switching timing information from the mobile switching center, the base station and the mobile station start transmission/reception of communication data at a new transmission rate from a time slot included in a first frame after the base station and the mobile station receive the information.

Thus, the transmission rate may be changed promptly and surely.

In a mobile communication system of the invention, when it is detected that a movement speed of the mobile station exceeds a range of a pedestrian's walking speed in the case that the movement speed is laid in the range of the pedestrian's walking speed, the mobile station sends car's movement speed information to this effect to the mobile switching center through the base station.

Thus, the time slot may be changed so that the time slot is suited to the car's movement speed.

A mobile communication system of the invention, when the mobile station detects that the movement speed of the mobile station falls below a range of the car's movement speed in the case that the movement speed is laid in the range of the car's movement speed, the mobile station sends car's movement speed releasing information to this effect to the mobile switching center through the base station.

Thus, the time slot may be changed so that the time slot is suited to the pedestrian's walking speed.

In a mobile communication system of the invention, the mobile switching center is provided with an information memory for storing the car's movement speed information in the case that the car's movement speed information is sent to the mobile switching center from the mobile station through the base station.

Thus, the mobile switching center may surely grasp the fact to the effect that the movement speed of the mobile station is laid in the range of the car's movement speed.

In a mobile communication system of the invention, the mobile switching center is provided with an information memory for storing the car's movement speed releasing information in the case that the car's movement speed releasing information is sent to the mobile switching center from the mobile station through the base station.

Thus, the mobile switching center may surely grasp the fact to the effect that the movement speed of the mobile station is laid in the range of the pedestrian's walking speed.

In a mobile communication system of the invention, the mobile switching center is provided with a system setting processor for changing a time slot so that a guard time of a data communication channel is suited to the car's movement speed in the case that the car's movement speed information is stored in the information memory.

Thus, the guard time of the data communication channel may be held to an appropriate value.

In a mobile communication system of the invention, the mobile switching center is provided with a system setting processor for changing a time slot so that a guard time of a data communication channel is suited to the pedestrian's walking speed in the case that the car's movement speed releasing information is stored in the information memory.

Thus, the guard time of the data communication channel may be held to an appropriate value.

In a mobile communication system of the invention, when the communication data are transmitted from the communication apparatus to the mobile station, the communication apparatus sends a data amount of the communication data to the mobile switching center.

Thus, the mobile switching center may grasp the data amount of the communication data. Therefore, when the communication apparatus transmits a large amount of communication data, the mobile switching center may judge if the mobile station may surely receive the large amount of the communication data or not.

In a mobile communication system of the invention, when the communication data are transmitted from the mobile station to the communication apparatus, the mobile station sends a data amount of the communication data to the mobile switching center.

Thus, the mobile switching center may grasp the data amount of the communication data. Therefore, when the mobile station transmits a large amount of communication data, the mobile switching center may judge if the communication apparatus may surely receive the large amount of the communication data or not.

In a mobile communication system of the invention, when the communication data are transmitted from the communication apparatus or the mobile station to another communication apparatus or another mobile station, the communication apparatus or the mobile station which transmits the communication data sends a data amount of the communication data to the mobile switching center.

Thus, the mobile switching center may grasp the data amount of the communication data. Therefore, when the communication apparatus or the mobile station transmits a large amount of communication data, the mobile switching center may judge if another communication apparatus or another mobile station may surely receive the large amount of the communication data or not.

In a mobile communication system of the invention, the mobile switching center determines the practicable maximum transmission rate on a basis of the maximum transmission rate to be executed by the mobile station and a state of currently empty data communication channels, judges if the data amount sent from the communication apparatus is transmittable within a predetermined time or not when the communication apparatus starts transmitting the communication data at the maximum transmission rate, and when judging that the data amount is not transmittable within the predetermined time, the mobile switching center disallows the transmission of the communication data.

Thus, reception errors of the communication data may be prevented.

In a mobile communication system of the invention, the mobile switching center determines the practicable maximum transmission rate on a basis of the maximum transmission rate to be handled by the mobile station and a state of currently free data communication channels, judges if the data amount sent from the mobile station is transmittable within a predetermined time or not when the mobile station starts transmitting the communication data at the maximum transmission rate, and upon judging that the data amount is not transmittable within the predetermined time, the mobile switching center disallows the transmission of the communication data.

Thus, reception errors of the communication data may be prevented.

In a mobile communication system of the invention, the mobile switching center determines the practicable maximum transmission rate on a basis of the maximum transmission rate to be handled by the mobile station and a state of currently free data communication channels, judges if the data amount sent from the communication apparatus or the mobile station transmitting communication data is transmittable within a predetermined time or not when the communication apparatus or the mobile station starts transmitting the communication data at the maximum transmission rate, and upon judging that the data amount is not transmittable within the predetermined time, the mobile switching center disallows the transmission of the communication data.

Thus, reception errors of the communication data may be prevented.

In a mobile communication system of the invention, when hand-over of the mobile station is carried out, the mobile switching center changes the transmission rate between the mobile station and a switched base station in accordance with a free data communication channel state of the switched base station.

Thus, the transmission rate of communication data may be optimized each time the hand-over of the mobile station is performed.

In a mobile communication system of the invention, the mobile switching center determines the switched base station before the hand-over of the mobile station is carried out, and judges the free data communication channel state of the switched base station.

Thus, disconnection of radio-connection caused due to the hand-over of the mobile station may be prevented.

In a mobile communication system of the invention, the mobile station detects electric field strength of radio waves transmitted from all the base stations adjacent to the base station to which the mobile station is connected at present to send the electric field strength to the mobile switching center.

Thus, the standard for selecting the optimal base station may be offered to the mobile switching center.

In a mobile communication system of the invention, when receiving an instruction from the mobile switching center, the mobile station sends the electric field strength to the mobile switching center.

Thus, the mobile switching center may obtain the electric field strength if necessary.

In a mobile communication system of the invention, in case of receiving an instruction from the base station, the mobile station sends the electric field strength to the mobile switching center.

Thus, when the base station judges that the mobile switching center requires the electric field strength, the mobile switching center may obtain the electric held strength if necessary.

In a mobile communication system of the invention, the mobile switching center compares the electric field strength of radio waves transmitted from the respective base stations with one another, and determines that a base station which transmitted a radio wave having the maximum electric field strength is made to be the switched base station.

Thus, the mobile switching center may determine the optimal base station as the switched base station.

In a mobile communication system of the invention, the mobile switching center selects a data communication channel which may achieve the maximum transmission rate in a range of the maximum transmission rates to be handled by the mobile station from among free data communication channels of the switched base station.

Thus, the transmission rate of communication data may be optimized each time the hand-over of the mobile station is performed.

In a mobile communication system of the invention, when the transmission rate is increased by carrying out the hand-over of the mobile station, the mobile switching center performs the hand-over before changing the transmission rate.

Thus, the hand-over of the mobile station may be performed promptly.

In a mobile communication system of the invention, when the transmission rate is decreased by carrying out the hand-over of the mobile station, the mobile switching center performs the hand-over after changing the transmission rate.

Thus, disconnection of radio-connection caused due to the hand-over of the mobile station may be prevented.

In a mobile communication system of the invention, when the transmission rate of communication data transmitted from the mobile station to the communication apparatus is increased, the mobile switching center checks for transmission power of the mobile station before increasing the transmission rate.

Thus, the mobile switching center may judge if the transmission rate of communication data may be actually increased or not.

In a mobile communication system of the invention, when the transmission rate of communication data transmitted from the communication apparatus to the mobile station is increased, the mobile switching center checks for transmission power of the base station before such an operation.

Thus, the mobile switching center may judge if the transmission rate of communication data may be actually increased or not.

In a mobile communication system of the invention, the mobile switching center checks for the transmission power of the mobile station by checking for received power of the base station.

Thus, the mobile switching center may surely confirm the transmission power of the mobile station.

In a mobile communication system of the invention, the mobile switching center checks for the transmission power of the base station by checking for the received power of the mobile station.

Thus, the mobile switching center may surely confirm the transmission power of the base station.

In a mobile communication system of the invention, the mobile switching center sends an instruction to enhance a transmission power level to the mobile station, and sends an instruction to send the received power to the base station.

Thus, the mobile switching center may judge if the transmission rate of communication data may be actually increased or not.

In a mobile communication system of the invention, the mobile switching center sends an instruction to enhance a transmission power level to the base station, and sends an instruction to send the received power to the mobile station.

Thus, the mobile switching center may judge if the transmission rate of communication data may be actually increased or not.

In a mobile communication system of the invention, when an increase in the transmission power of the mobile station corresponding to the change in the transmission rate is not obtainable, the mobile switching center disallows the change in the transmission rate.

Thus, when the transmission rate cannot be increased, the occurrence of a useless process of increasing the transmission rate can be prevented, and at the same time the occurrence of a communication abnormality resulting from such a process can be prevented.

In a mobile communication system of the invention, when an increase in the transmission power of the base station corresponding to the change in the transmission rate is not obtainable, the mobile switching center disallows the change in the transmission rate.

Thus, when the transmission rate cannot be increased, the useless process of increasing the transmission rate can be prevented from being caused, and at the same time communication abnormality resulting from such process can be prevented from being caused.

In a mobile communication system of the invention, when an increase in the transmission power of the mobile station corresponding to the change in the transmission rate is obtainable, the mobile switching center allows the change in the transmission rate.

Thus, the transmission rate of communication data can be increased.

In a mobile communication system of the invention, when an increase in the transmission power of the base station corresponding to the change in the transmission rate is obtainable, the mobile switching center allows the change in the transmission rate.

Thus, the transmission rate of communication data can be increased.

In a mobile communication system of the invention, when the transmission rate is doubled, the mobile switching center sends an instruction to enhance the transmission power by 3 dB to the mobile station.

Thus, the transmission rate can be doubled.

In a mobile communication system of the invention, when the transmission rate is doubled, the mobile switching center sends an instruction to enhance the transmission power by 3 dB to the base station.

Thus, the transmission rate can be doubled.

BRIEF DESCRIPTION OF THE DRAWINGS

FIG. 3 is a data structure diagram illustrating a time slot structure of PCS system and a cellular system using time-divided CDMA, high speed TDMA and low speed TDMA and so on;

FIG. 9 is a table showing the contents of a mobile switching center information memory 35 storing a transmission rate and a rate switching time to be handled by each mobile station;

FIG. 15 is a flow chart showing the transmission power check process.

BEST MODES FOR CARRYING OUT THE INVENTION

In order to describe the present invention in more detail, the best modes for carrying out the present invention will be described with reference to the attached drawings below.

Embodiment 1

Figure 1:
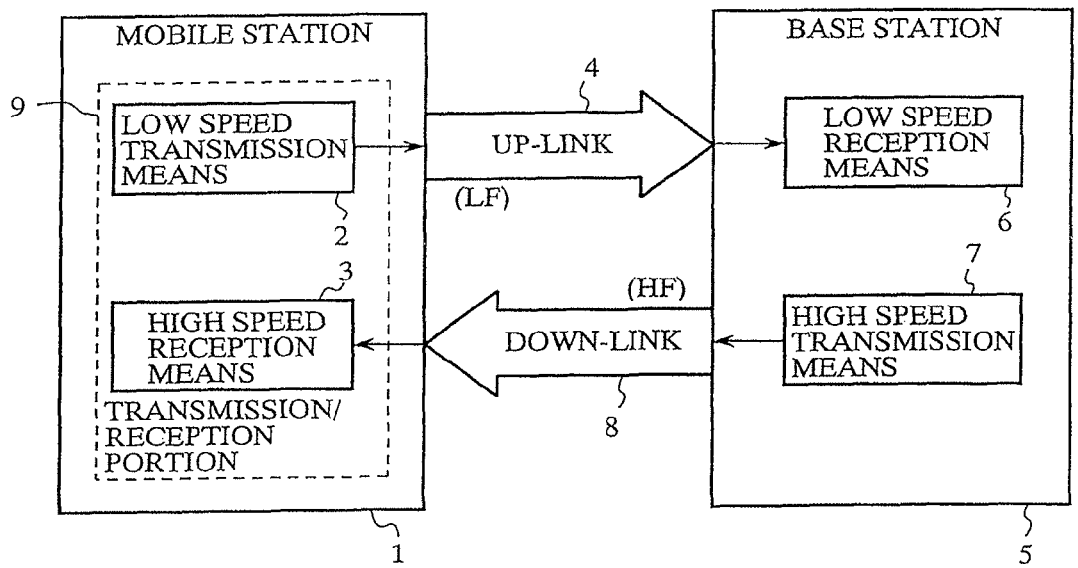
FIG. 1 is a construction view of a conventional mobile communication system.
Figure 2:
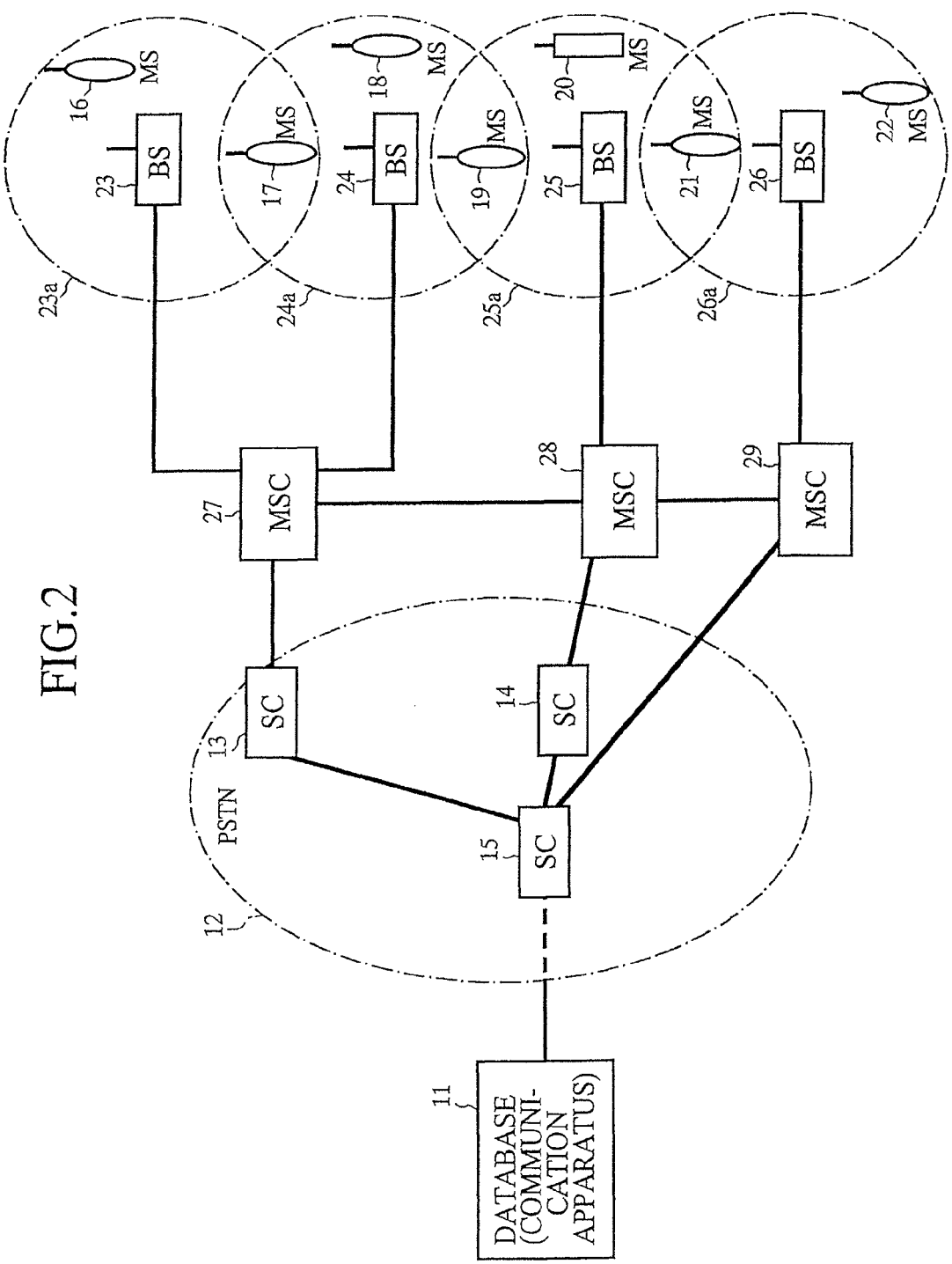
FIG. 2 is a construction view of a mobile communication system of Embodiment 1 according to the present invention.

FIG. 2 is a construction view illustrating a mobile communication system of Embodiment 1 according to the present invention. In FIG. 2, reference numerals 11 and 12 designate a database (communication apparatus) connected to and a public communication network (Public Service Telephone Network: PSTN), respectively. Reference numerals 13 to 15 and 16 to 22 designate switching centers and communication apparatus, i.e., portable communication apparatuses or half fixed WLL station (Wireless Local Loop), respectively. These communication apparatus and so on will be hereinafter referred to as a mobile station. Reference numerals 23 to 26 designate base stations which inter-exchange control information necessary for radio communication with mobile station 16 and so on belonging to radio-covered areas through a control channel and transmit/receive communication data including speech data, image data, and so on to/from the mobile station 16 and so on through a data communication channel, respectively. Reference numerals 23a, 24a, 25a and 26a designate a radio-covered area of the mobile station 23, a radio-covered area of the mobile station 24, a radio-covered area of the mobile station 25, and a radio-covered area of the mobile station 26, respectively. Reference numerals 27, 28 and 29 designate mobile switching centers which receive control information necessary for data communication from the database 11 connected to PSTN 12 and receive control information transmitted from the mobile station 16 and so on through the base station 23 and so on, and set a transmission rate of communication data transmitted/received between the mobile station 16 and so on and the database 11 and the like, respectively.

An operation of the mobile communication system of Embodiment 1 will be described below.

First, in the mobile communication system, a subscriber's number, user ID, accounting, authentication, and so on are control information independent from the characteristics of a communication medium.

On the other hand, an allowable transmission rate or a rate switching time of a user terminal (mobile station 16, database 11, and so on) markedly differs from one another depending on each user terminal or setting of a system.

Hereinafter, in this specification, the former will not be referred to in particular, but how to handle the transmission rate and so on depending on the characteristics of the communication medium will be described below.

First, as illustrated in FIG. 2, the mobile switching center 27 and so on controlling the base station 23 and so on are wire-connected to PSTN 12. On the other hand, the mobile station 16 and so on transmit/receive a control signal and so on to/from the base station 23 and so on by using a digital modulation system and the mobile station 16 and so on are radio-connected to the base station 23 and so on using the transmission systems such as Frequency Division Multiple Access/Time Division Duplex (FDMA/TDD) system, Code Division Multiple Access/Time Division Duplex (CDMA/TDD) system, Multi-Carriers Time Division Multiple Access/Frequency Division Duplex (TDMA/FDD) system, TDMA/TDD system, time-divided CDMA/FDD system, time-divided CDMA/TDD system, and so on.

Figure 3:
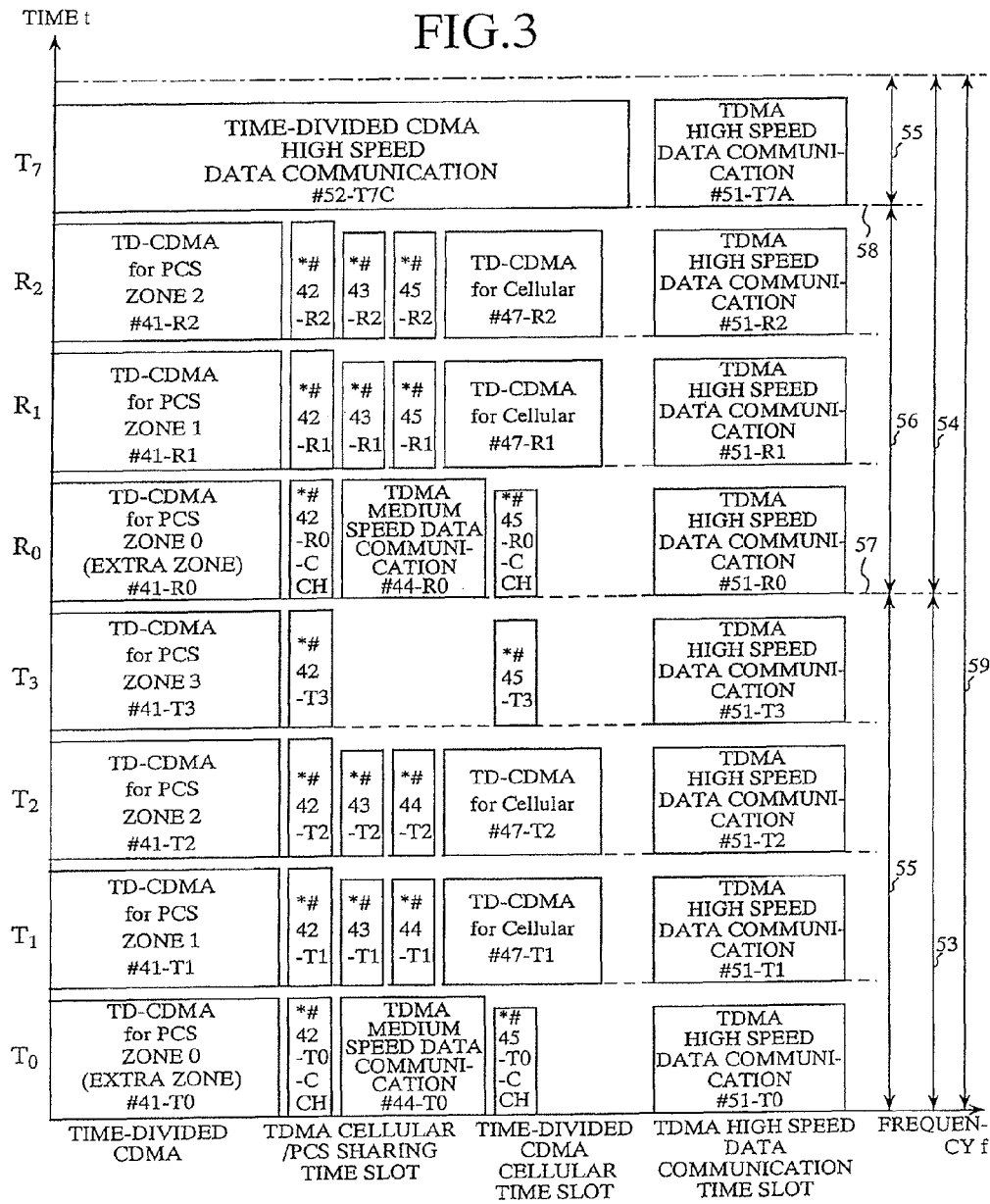

In FIG. 3, the structure of a time slot for PCS (Personal Communication System) using time-divided CDMA and the cellular system is shown. #41-0 to 3 are time slots for PCS and #47-T1/R1 and T2/R2 are time slots for the cellular system. Moreover, time slots #44-T0/R0 for TDMA medium speed data communication, time slots #51-T0/R0, T1/R1, T3, and T7A for TDMA high speed data communication and time slots #52-T7C for time-divided CDMA high speed data communication are shown.

However, an example of the other low speed TDMA time slots (marked with "*") are shown, which are used for voice data, low speed data or control channels.

Moreover, in FIG. 3, down-link time slots are five slots of T0, T1, T2, T3 and T7, while up-link time slots are three slots of R0, R1, and R2, and these time slots form the asymmetrical time-division duplex system (TDD system).

Figure 4:
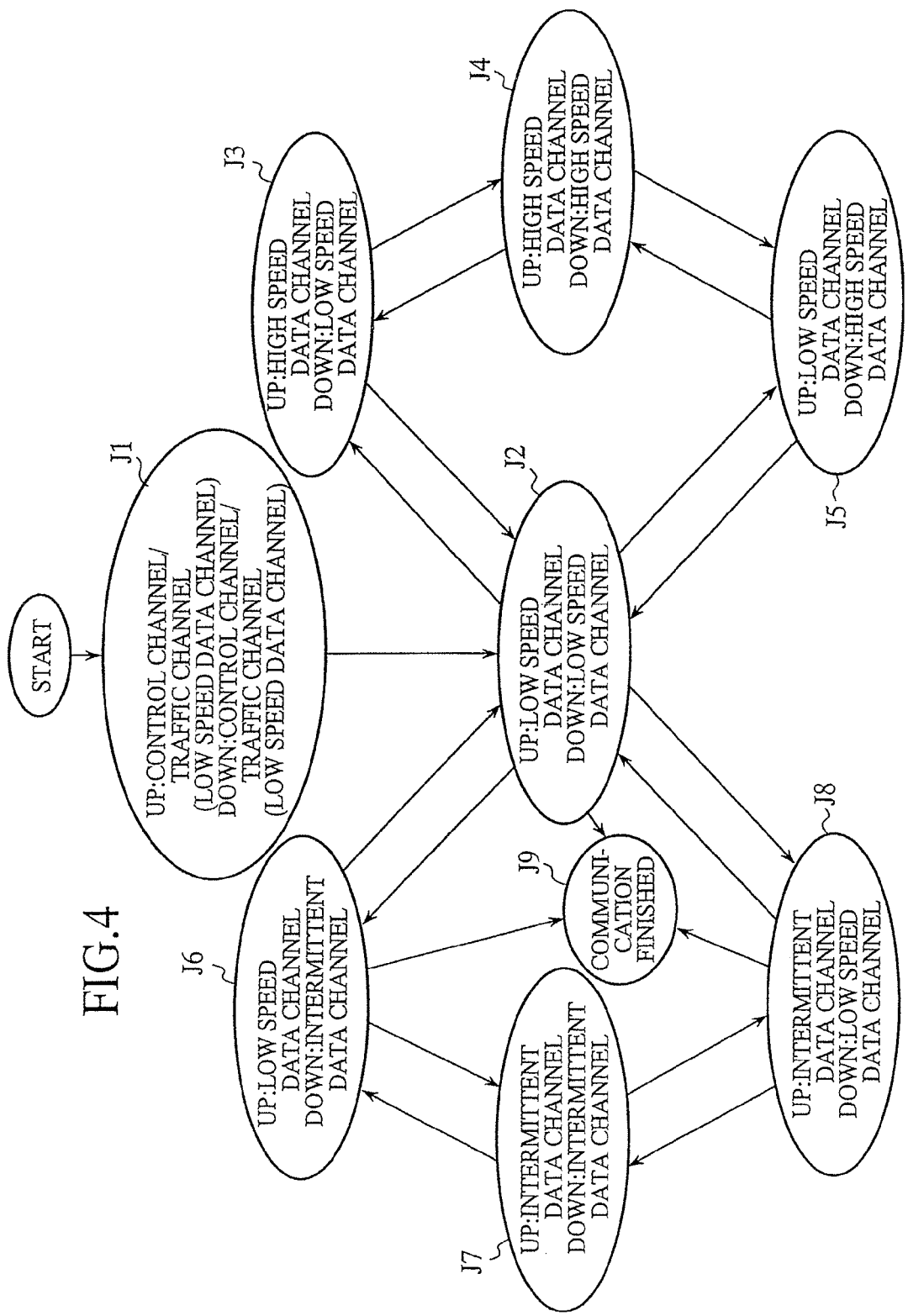
FIG. 4 is a state transition diagram of the mobile communication system.
Figure 5:
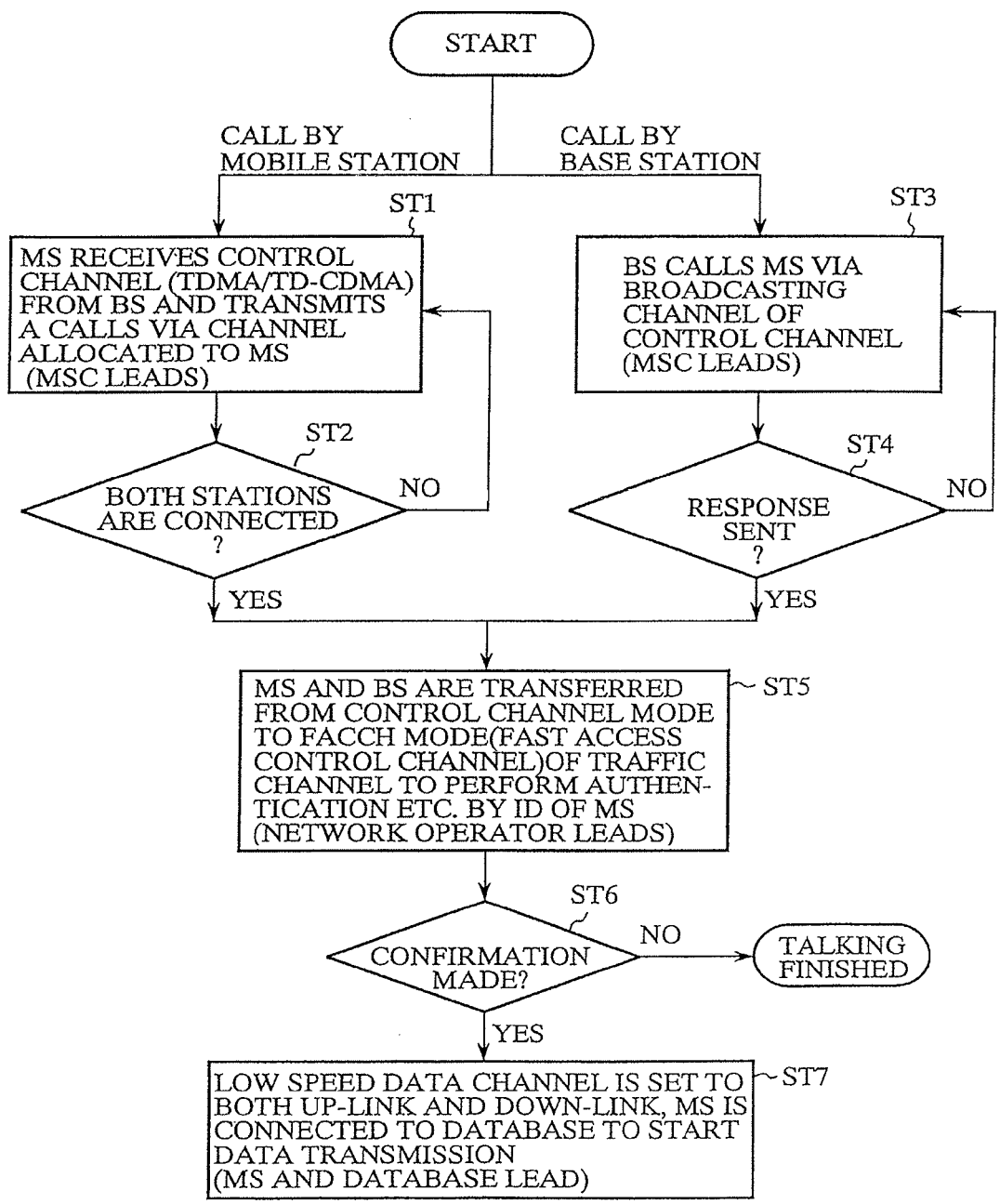
FIG. 5 is a flow chart explaining an operation of the mobile communication system of Embodiment 1 according to the present invention.

Next, the state transition of radio circuits between the mobile station 16 and so on the base station 23 and so on will be described with reference to the state transition diagram of FIG. 4 and the flow chart of FIG. 5 (when there are a plurality of mobile stations radio-connected to the base station, the number of the state transition diagrams similar to FIG. 4 are equal to the number of the plurality of mobile stations, but for the explanatory convenience, the state transition between the mobile station 16 and the base station 23 will be described).

First, when the mobile station 16 transmits a call, the mobile station 16 receives a control channel transmitted by the base station 23 in the state J1 to make a request for radio connection through time slots in the control channel allocated to the mobile station 16 (step ST1).

When the request for radio-connection is transmitted from the mobile station 16, in addition to receiving the request for radio-connection through the base station 23, the mobile switching center 27 judges if the radio-connection is valid or not to set a traffic channel between the mobile station 16 and the base station 23 (step ST2).

On the other hand, when the base station 23 transmits a call (the call of the base station 23 is a call according to a call of the database 11), the base station 23 transmits a telephone number of the mobile station 16 designated by the database 11 using a broadcasting channel in control channels (step ST3).

When the mobile station 16 which has received the own station telephone number responds to the base station 23 through the designated control channel, the mobile switching center 27 sets a talking channel or a low speed data channel between the mobile station 16 and the base station 23 (step ST4).

When setting the talking channel, the mobile switching center 27 receives control information necessary for radio-communication through a control channel from the mobile station 16. For example, the mobile switching center 27 receives a transmission rate and so on to be handled by the mobile station 16.

Then, after the talking channel is set between the mobile station 16 and the base station 23, an on-line operator of PSTN12 receives mobile station ID from the mobile station 16 and authenticates the mobile station 16 and the like (step ST5).

When the on-line operator of PSTN12 authenticates the mobile station 16, the mobile switching center 27 sets a data communication channel between the mobile station 16 and the base station 23 (steps ST6, ST7) to change the state from J1 to J2.

In such way, transmission/reception of communication data is started between the mobile station 16 and the database 11. First, the database 11 starts preliminary communication to check if the mobile station 16 has the capacity to handle communication data.

In the case of such preliminary communication, since a transmitted data amount is small, the transmission rates of the up-link (transmission path for transmitting communication data from the mobile station 16 to the database 11) and the down-link (transmission path for transmitting communication data from the database 11 to the mobile station 16) are usually set in a low speed data transmission range (less than 19.6 Kbps).

The transmission rates of the up-link and the down-link are set in a low speed data transmission range. However, the transmission rate of the up-link does not necessarily agree with the transmission rate of the down-link. For example, the transmission line of the up-link is set to 8 Kbps, while the transmission line of the down-link is set to 2 Kbps (setting in asymmetrical radio-communication).

Moreover, when the high speed data transmission or the medium speed data transmission is necessary from the start, the transmission rate is sometimes set in a range of the high speed data transmission (equal to or more than 200 Kbps) or a range of the medium data transmission (equal to or more than 19.6 Kbps and less than 200 Kbps).

In such way, the transmission rate of the data communication channel for radio-connecting the mobile station 16 to the base station 23 and transmission/reception of communication data is started. However, a data amount is not constantly fixed. As time passes, the data amount is sometimes changed. This results in a trouble to the effect that transmission data cannot be transmitted in a short time at a firstly set transmission rate or the like.

For this reason, in Embodiment 1, when a request for changing the transmission rate is made by the mobile station 16 or the database 11 after the transmission rate of communication data has been set once, the mobile switching center 27 takes into consideration the transmission rate to be handled by the mobile station 16 and the state of currently free data communication channels to change the transmission rate of the up-link and the transmission rate of the down-link individually and independently. J3 to J8 show the states in which, the transmission rate of the up-link and the transmission rate of the down-link are changed in response to the request made by the mobile station 16 or the database 11. The intermittent data transmission in J6 to J8 is data transmission in which radio-communication between the mobile station 16 and the base station 23 is maintained but there is a period in which no communication data is transmitted. It is considered that the transition state to such intermittent data-transmission is allowed. In this case, if accounting of connection fee is imposed only in transmission time of communication data, communication fee can be made cheap and the base station 23 can release the data communication channel in a time period such that no communication data is transmitted.

As described above, the mobile communication system is formed such that the mobile switching center 27 changes the transmission rate of communication data transmitted from the mobile station 16 and so on to the database 11 or communication data transmitted from the database 11 to the mobile station 16 and so on individually and independently in accordance with a request of the mobile station 16 and so on or the database 11. Therefore, even though a data amount of communication data transmitted from the mobile station 16 and so on to the database 11 or a data amount of communication data transmitted from the database 11 to the mobile station 16 and so on are changed after the transmission rate of communication data has been set once, the transmission rate can be changed to a transmission rate corresponding to the data amount.

Therefore, radio environment similar to that of multimedia communication can be produced.

Embodiment 2

Figure 6:
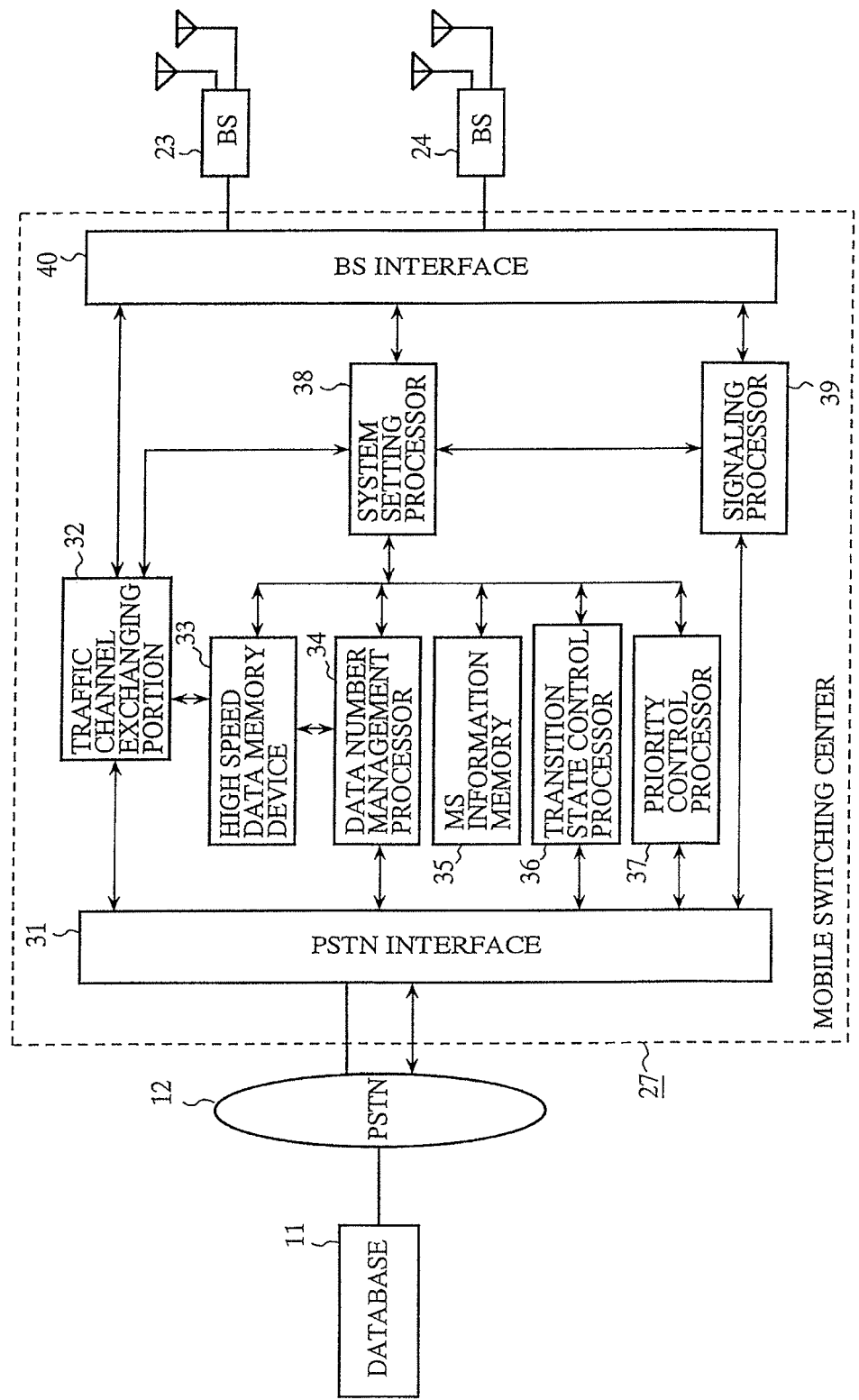
FIG. 6 is a detailed configuration diagram illustrating a mobile switching center of a mobile communication system of Embodiment 2 according to the present invention.

FIG. 6 is a detailed configuration diagram illustrating a mobile switching center of a mobile communication system of Embodiment 2 according to the present invention. In FIG. 6, reference numerals 31, 32, 33 and 34 designate a PSTN interface, a talking channel exchanging portion, a high speed data memory device for functioning as a buffer of communication data when performing high speed data transmission and a data number management processor, respectively. Reference numeral 35 designates a mobile station information memory which stores the transmission rate to be handled by the mobile station 16 and so on and also stores a rate switching time of the mobile station 16 and so on. In addition, the mobile station information memory 35 stores car's movement speed information, car's movement speed releasing information, and so on.

Furthermore, reference numerals 36, 37 and 38 designate a transition state control processor for managing the transition state of the transmission rate for each mobile station, a priority control processor for managing a setting operation of a data communication channel by the mobile switching center 27 and a changing operation of the transmission rate by the mobile switching center 27 and a system setting processor for changing a time slot so that a guard time of a data communication channel is suited to the movement speed of the mobile station 16 and so on in the case that the car's movement speed information or the car's movement speed information is stored in the mobile station information memory 35, respectively. Reference numerals 39 and 40 designate a signaling processor and a base station interface, respectively. In FIG. 6, the construction of the mobile switching center 27 is illustrated, and the construction of the mobile switching center 28 and the construction of the mobile switching center 29 are similar to that of the mobile switching center 27.

Figure 7:
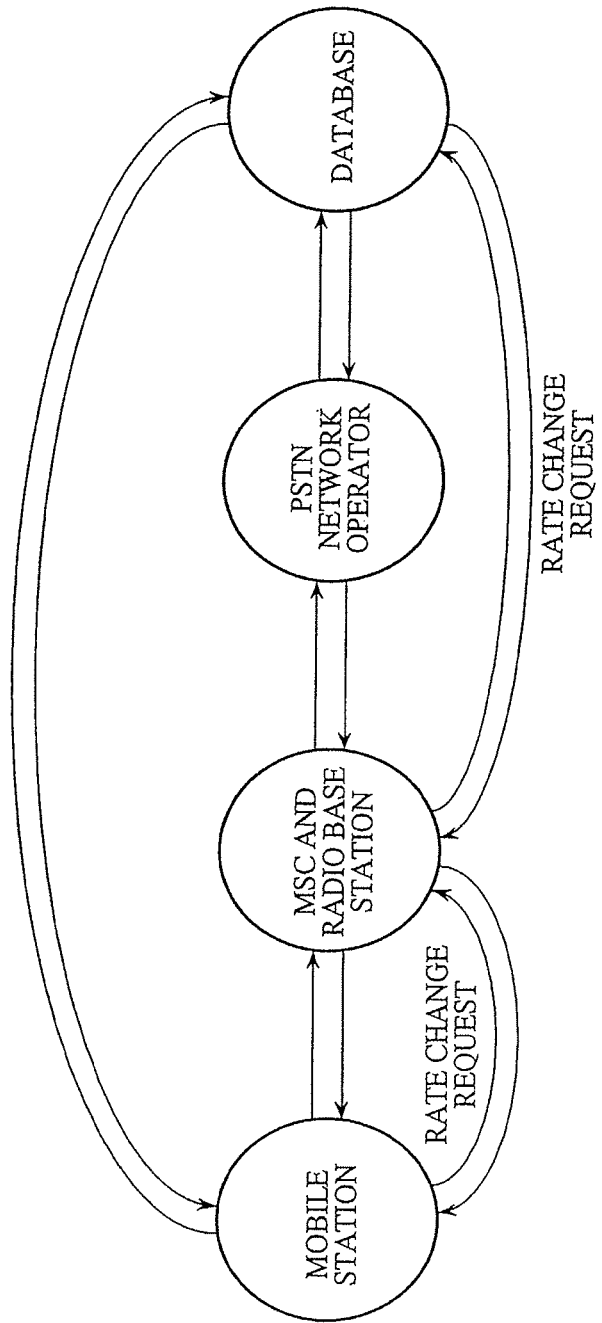
FIG. 7 is a state transition diagram explaining a control structure of the mobile communication system.

Subsequently, an operation of the mobile communication system of Embodiment 2 will be described. In Embodiment 1, the arrangement of the mobile switching center 27 and so on are not referred to in particular. However, the mobile switching center 27 and so on are formed as illustrated in FIG. 6. As illustrated in FIG. 7, in the data speed change process of changing the transmission rate of communication data, the mobile switching center and the base station become a window for receiving a request for changing the transmission rate from the mobile station 16 or the database 11 and the mobile switching center 27 and so on are in charge of control of the data speed change process.

Moreover, the system setting processor 38 performs processing of receiving the request for changing the transmission rate in particular in the mobile switching center 27 and so on and sets the transmission rate of communication data to the requested transmission rate.

In addition, when the database 11 holds a large amount of data on geology, the earth's crust, and so on like a database of a earth physics laboratory for example and has the function to transmit/receive the large amount of data, it can be considered that the database 11 transmits/receives the large amount of data to/from the mobile station 16 and so on.

However, when the transmission rate and so on is not managed and the large amount of data is merely transmitted in transmitting the large amount of data, the transmission performance of the mobile station 16 or the database 11 is not given full play and the transmission time of data is increased more than expected sometimes.

Therefore, in such case, since the mobile switching center receives the request for changing the transmission rate from the mobile station 16 or the database 11 to change the transmission rate, the transmission performance can be given full play.

Embodiment 3

Figure 8:
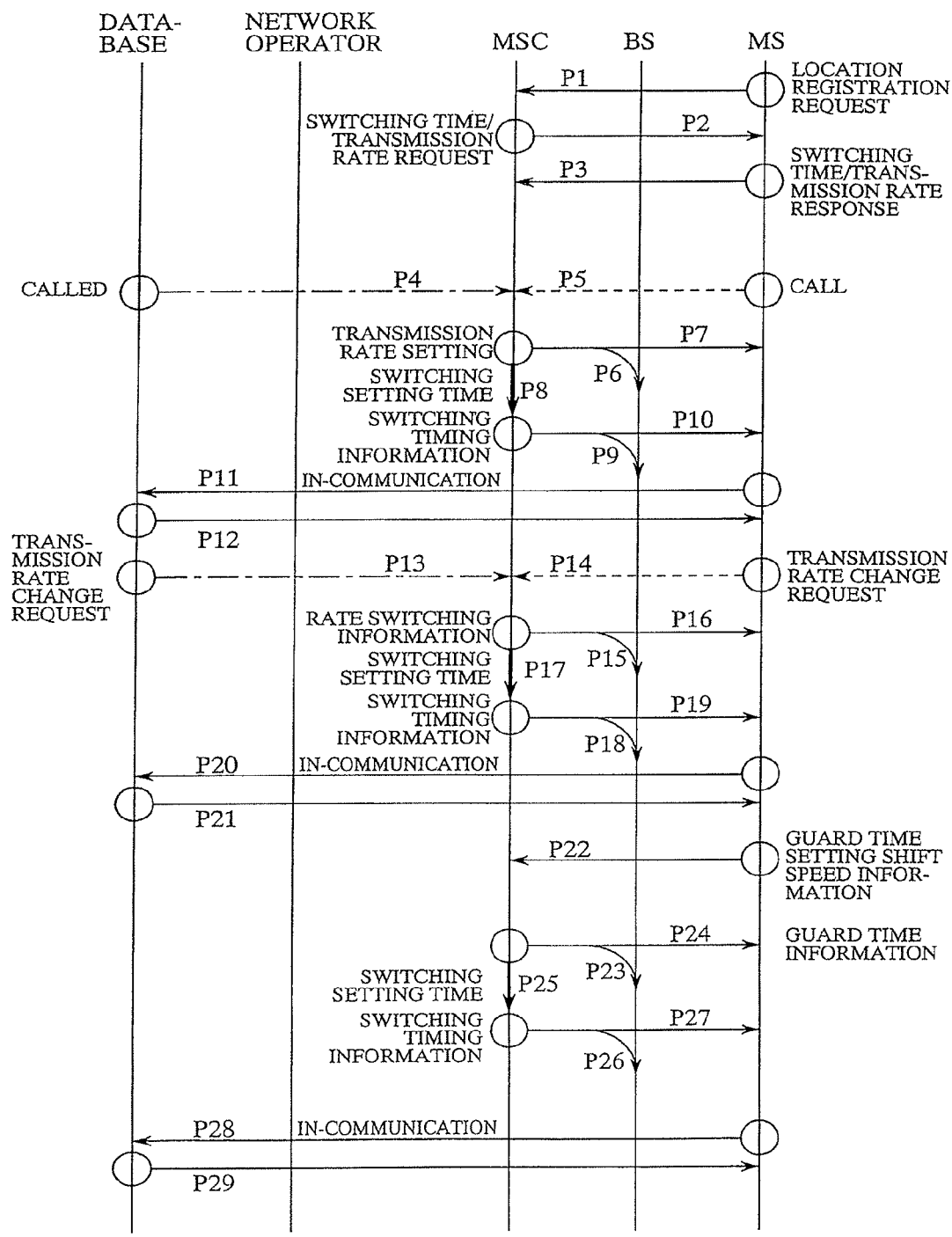
FIG. 8 is a flow chart explaining a mobile communication system of Embodiment 3 according to the present invention.

FIG. 8 is a flow chart explaining a mobile communication system of Embodiment 3 according to the present invention and FIG. 9 is a table showing the contents of the mobile switching center information memory 35 which stores the transmission rate to be handled by each mobile station and the rate changing time.

An operation of the mobile communication system of Embodiment 3 will described below.

First, when the mobile station 16 enters the radio-covered area 23a of the base station 23 (in Embodiment 3, the mobile station 16 is used as an example to explain the operation), the mobile station 16 transmits a location registration request to the base station 23 through a control channel (P1).

Subsequently, when the base station 23 receives the location registration request from the mobile station 16, the base station 23 registers the location of the mobile station 16 and transmits the location registration request to the mobile switching center 27 (P1).

When the mobile switching center 27 receives the location registration request from the base station 23, the mobile switching center 27 transmits a signal for obtaining the report of information on the transmission rate to be handled by the mobile station (hereinafter referred to as "transmission rate") and the rate switching time to the mobile station 16 through the base station 23 (P2).

In such way, when the mobile station 16 transmits the information on the transmission rate and the rate switching time to the mobile switching center 27 through the base station 23 (P3), the mobile switching center 27 stores the transmission rate and the rate switching time in the mobile station information memory 35 to register the transmission rate and so on of the mobile station 16 (see FIG. 9).

Thus, in the state in which the transmission rate and so on of the mobile station 16 is stored, when the database 11 or the mobile station 16 transmits a call (call includes the information on the transmission rate required by a calling side) (P4, P5), the mobile switching center 27 selects the transmission rate required by the calling side from among transmission rates stored in the mobile station information memory 35 to send information on the transmission rate to the base station 23 and the mobile station 16 (P6, P7).

Furthermore, after the mobile switching center 27 sends information on the transmission rate to the base station 23 and the mobile station 16, the mobile switching center 27 counts time from the time as a starting point, at which the information has been sent. When the time has reached the rate switching time stored in the mobile station information memory 35, the mobile switching center 27 sends the switching timing information to the base station 23 and the switching timing information (P9, P10). In this example, the mobile switching center 27 counts time to send the switching timing information, but the base station 23 may count time to send the switching timing information to the mobile station 16 according to an instruction of the mobile switching center 27.

After the switching timing information is sent to the base station 23 and the mobile station 16, both the stations 23 and 16 start transmission/reception of communication data at the transmission rate corresponding to the earlier sent transmission rate information (P11, P12).

In such way, transmission/reception of communication data is started. When the database 11 or the mobile station 16 transmits the request for changing the transmission rate during communication of the communication data (P13, P14), the mobile switching center 27 selects the transmission rate corresponding to this request from among the transmission rates stored in the mobile station information memory 35 to send the selected transmission rate to the base station 23 and the mobile station 16 (P15, P16).

Moreover, after sending information on the selected transmission rate to the base station 23 and the mobile station 16, the mobile switching center 27 counts time from the time of a starting point at which the information has been sent. When the time has reached the rate switching time stored in the mobile station information 35, the mobile switching center 27 sends the switching timing information to the base station 23 and the mobile station 16 (P18, P19).

After the switching timing information is sent to the base station 23 and the mobile station 16, both the stations 23 and 16 resume transmission/reception of communication data at the sent new transmission rate from a time slot in the first frame after the information is sent (P20, P21).

Thus, the transmission rate of communication data is changed. When the mobile station 16 transmits a request for changing a guard time of TDMA system in accordance with the change of the transmission rate, the mobile switching center 27 sends information on a new guard time to the base station 23 and the mobile station 16 (P23, P24).

Moreover, after the mobile switching center 27 sends information on the new guard time to the base station 23 and the mobile station 16, the mobile switching center 27 counts time from the time of a starting point at which the information has been sent. When the time has reached the time designated by the mobile station 16, the mobile switching center 27 sends the switching timing information to the base station 23 and the mobile station 16 (P26, P27).

After the switching timing information is sent to the base station 23 and the mobile station 16, both the stations 23 and 16 resume transmission/reception of communication data using the new guard time (P28, P29).

As described above, in the mobile communication system of Embodiment 3, when the mobile station 16 resisters an own location, the mobile switching center 27 registers the transmission rate of the mobile station 16 and also registers the rate switching time of the mobile station 16. Therefore, the mobile switching center 27 can change the transmission rate of communication data or the guard time quickly if necessary.

In addition, in the mobile communication system of Embodiment 3, the guard time of TDMA system is changed in accordance with the change of the transmission rate. Specifically, there are many cases in which the guard time is changed. When the mobile station detects that the movement speed of the mobile station exceeds the pedestrian's walking speed in the case that the movement speed of the mobile station is laid in a range of the pedestrian's walking speed (for example, the movement speed is less than 4 km/hour), the mobile station requires the change of the guard time by sending car's movement speed information to this effect to the mobile switching center through the base station. When the mobile station detects that the movement speed of the mobile station falls below a range of the car's movement speed in the case that the movement speed of the mobile station is laid in a range of the car's movement speed (for example, the movement speed is more than 4 km/hour), the mobile station requires the change of the guard time by sending car's movement speed releasing information to this effect to the mobile switching center through the base station.

The car's movement speed information and the car's movement speed releasing information are stored in the mobile station information memory 35 of the mobile switching center 27. When the car's movement speed information and the car's movement speed releasing information are stored in the mobile station information memory 35, the system setting processor 38 changes the time slot such that the guard time of the data communication channel is suited to the pedestrian's walking speed or the car's movement speed.

Embodiment 4

Figure 10:
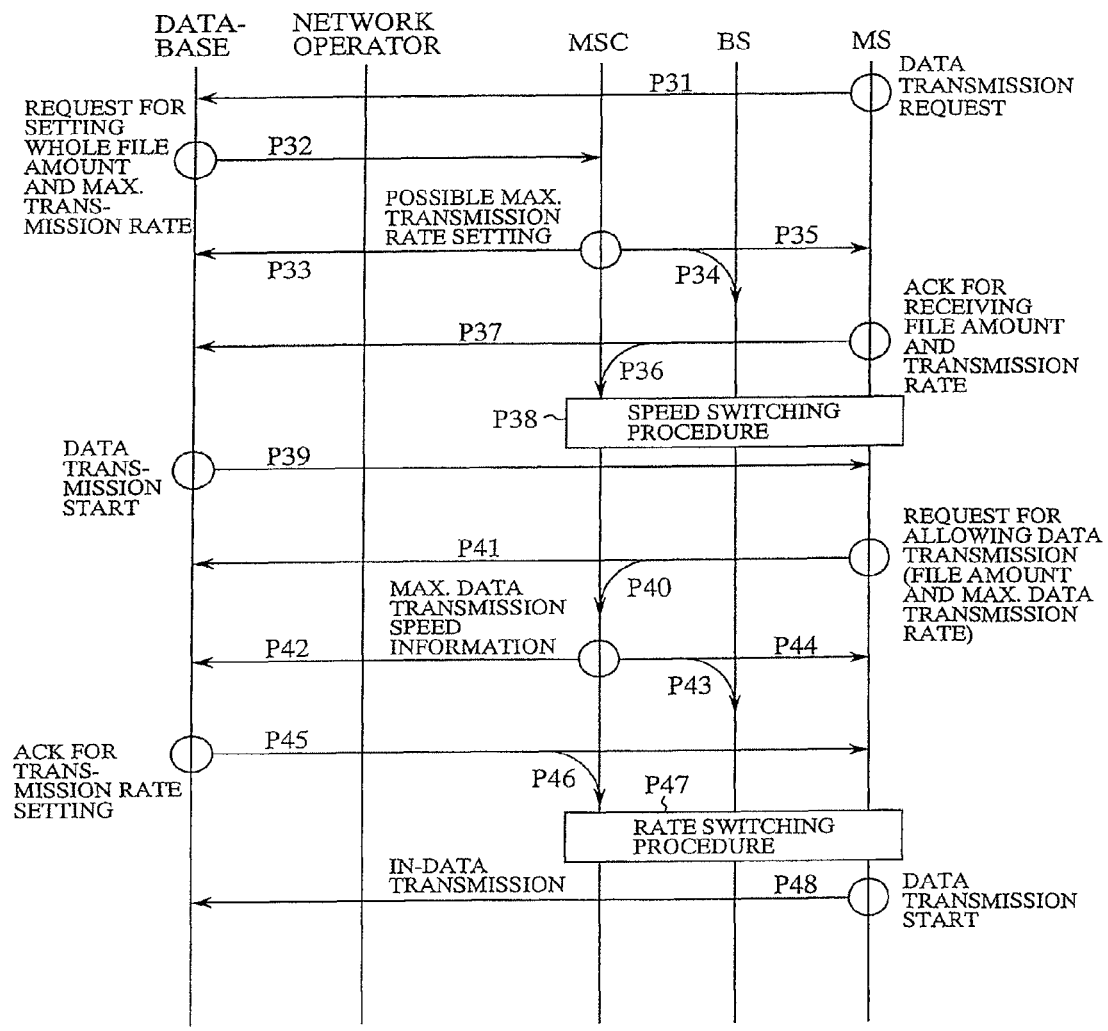
FIG. 10 is a transmission flow chart explaining a mobile communication system of Embodiment 4 according to the present invention.

FIG. 10 is a transmission flow chart explaining a mobile communication system of Embodiment 4 according to the present invention;

An operation of the mobile communication system of Embodiment 4 will be described below.

First, like Embodiment 1, a data communication channel is set between a mobile station 16 and a base station 23 by making a request for transmitting data by the mobile station 16, and communication data, and transmission/reception of communication data is started (in Embodiment 4, the mobile station 16 is also used as an example for the description sake).

However, in Embodiment 4, when the mobile station 16 requires transmission of communication data to a database 11 (P31), the database 11 sends a data amount of communication data to the mobile switching center 27 and also makes a request for transmitting information on the maximum transmission rate to be handled by the mobile station 16 to the mobile switching center 27 (P32).

Since the handlable maximum transmission rate is determined based on the transmission performance of the mobile station 16 and the state of currently free data communication channels, the mobile switching center 27 refers to the transmission rate of the mobile station 16 stored in a mobile station information memory 35 and also checks for the state of currently free data communication channels to determine the maximum transmission rate actually to be handled by the mobile station 16.

When transmission of communication data is started at the practicable maximum transmission rate, the mobile switching center 27 judges if the data amount sent from the database 11 can be transmitted within a predetermined time or not. When judging that the data amount cannot be transmitted within the predetermined time, the mobile switching center 27 disallows transmission of communication data and sends information to this effect to the mobile station 16 and the database 11.

On the other hand, when judging that the data amount can be transmitted within the predetermined time, the mobile switching center 27 sends information on the maximum transmission rate to the database 11, the base station 23 and the mobile station 16 (P33, P34 and P35).

Then, ACK signal for acknowledging that the transmission rate is changed to the maximum transmission rate is sent from the mobile station 16 to the mobile switching center 27 and the database 11 (P36, P37), the mobile switching center 27 performs processing for switching the transmission rate of communication data like Embodiment 3 (P38).

After the mobile switching center 27 switches the transmission rate of communication data, the database 11 transmits the communication data to the mobile station 16 at the transmission rate (P39).

Next, when the mobile station 16 transmits a large amount of communication data to the database 11, the mobile station 16 transmits the request for transmitting data including the data amount of communication data to the mobile switching center 27 and the database 11 (P40, P41).

Then, the mobile switching center 27 refers to the transmission rate of the mobile station 16 stored in the mobile station information memory 35 and also checks for the state of currently free data communication channels to determine the practicable maximum transmission rate.

Subsequently, the mobile switching center 27 judges if the data amount of communication data sent from the mobile station 16 is transmittable within a predetermined time or not when transmission of communication data is started at the practicable maximum transmission rate. When judging that the data amount is not transmittable within the predetermined time, the mobile switching center 27 disallows the transmission of communication data and sends information to this effect to when judging that the data amount is not transmittable within the predetermined time, the mobile switching center 27 disallows the transmission of communication data and sends information to this effect to the mobile station 16 and the database 11.

On the other hand, when judging that the data amount is transmittable within the predetermined time, the mobile switching center 27 sends information on the maximum transmission rate to the database 11, the base station 23 and the mobile station 16 (P42, P43, P44).

Then, when the database 11 sends ACK signal for acknowledging that the transmission rate is changed to the maximum transmission rate to the mobile switching center 27 and the mobile station 16 (P45, P46), the mobile switching center 27 performs processing for switching the transmission rate of communication data like Embodiment 3 (P47).

After the mobile switching center 27 switches the transmission rate of communication data, the mobile station 16 transmits communication data to the database. 11 at the transmission rate (P38).

As apparently described above, according to Embodiment 4, when the database 11 and so on transmits communication data to the mobile station 16 and so on, the database 11 and so on are designed to send the data amount of communication data to the mobile switching center 27. Therefore, the mobile switching center 27 can grasp the data amount communication data. As a result, when the database 11 and so on transmit the large amount of communication data, the mobile switching center 27 can judge whether the mobile station 16 and so on can receive the large amount of communication data or not.

Moreover, when the database 11 and so on start transmission of communication data at the maximum transmission rate, the mobile switching center 27 judges if the data amount sent from the database 11 and so on are transmittable within a predetermined time or not. When judging that the data amount is not transmittable within the predetermined time, the mobile switching center 27 disallows transmission of communication data. Therefore, reception errors of communication data can be prevented.

In Embodiment 4, the two cases are described as follows: the case in which communication data are transmitted from the database 11 to the mobile station 16; and the case in which communication data are transmitted from the mobile station to the database 11. However, Embodiment 4 may be applied to a case in which communication data are transmitted from the database 11 to another database and a case in which communication data are transmitted from the mobile station 16 to another mobile station, which results in obtaining the similar effect.

Embodiment 5

Figure 11:
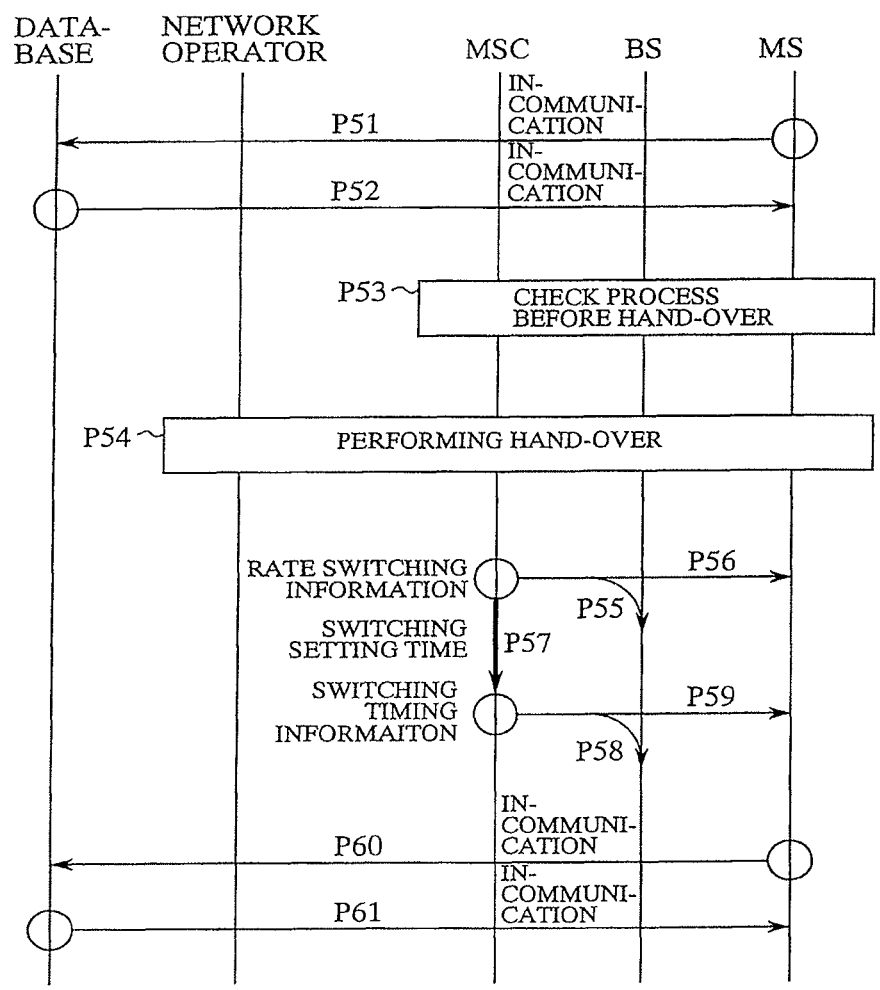
FIG. 11 is a transmission flow chart explaining a mobile communication system of Embodiment 5 according to the present invention.
Figure 12:
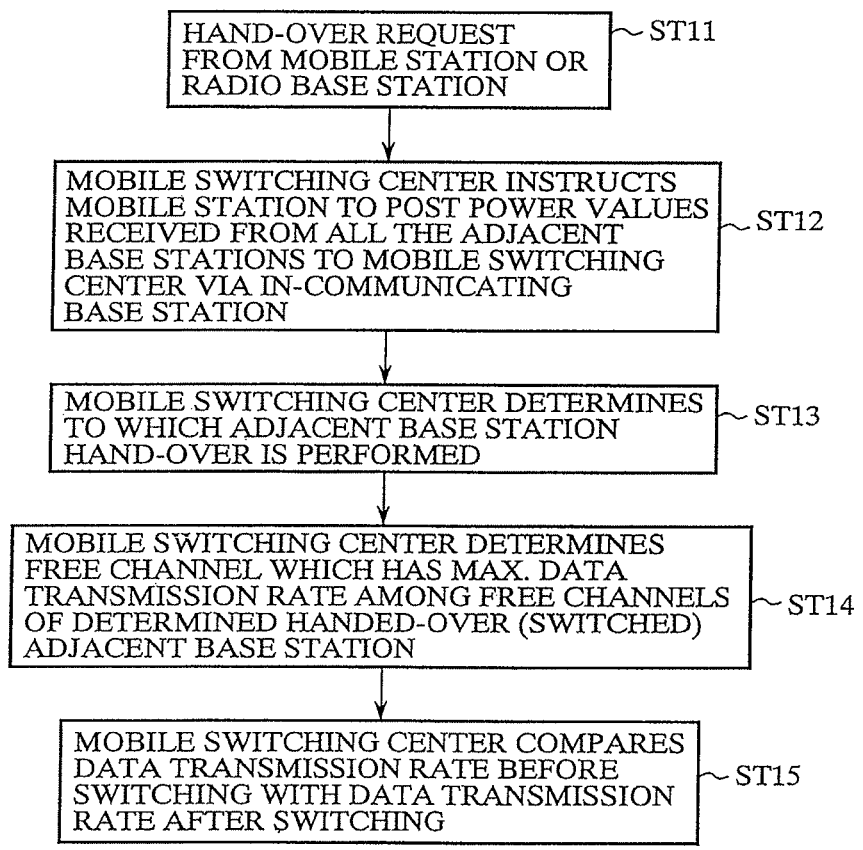
FIG. 12 is a flow chart showing the check process before performing hand-over.
Figure 13:
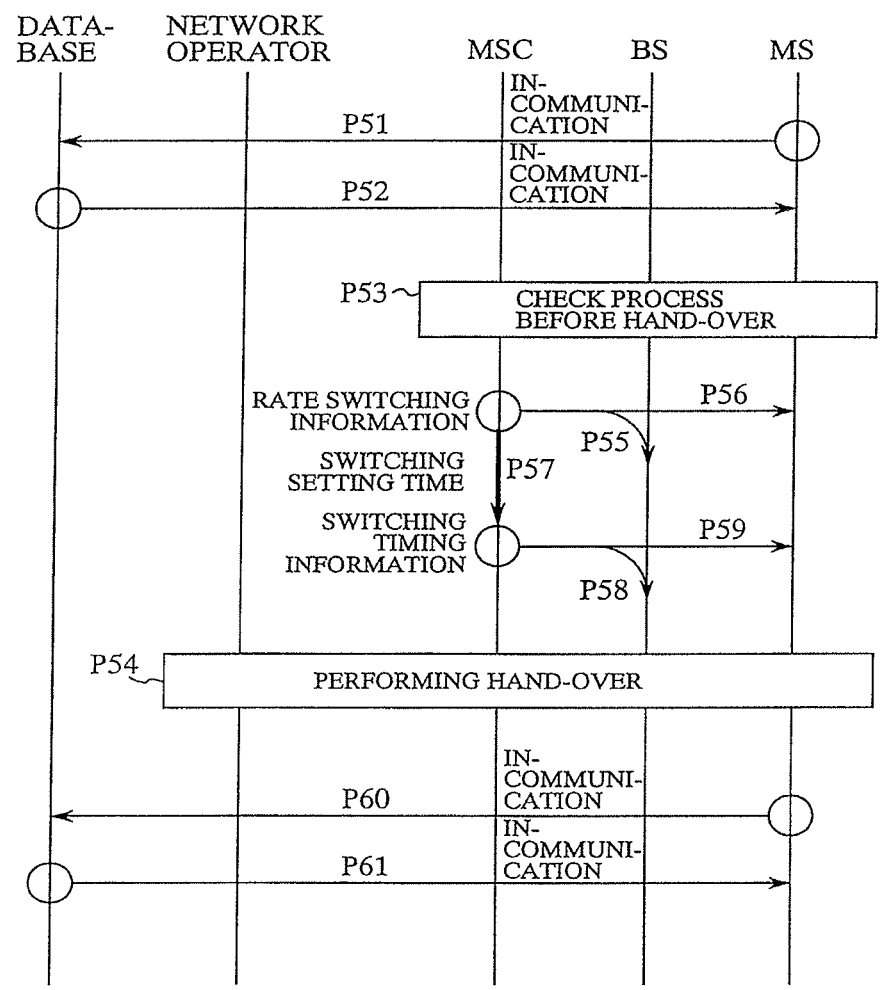
FIG. 13 is a flow chart explaining a mobile communication system of Embodiment 6 according to the present invention.

FIG. 11 is a transmission flow chart illustrating a mobile communication system of Embodiment 5 according to the present invention, and FIG. 12 is a flow chart showing the check process before hand-over.

An operation of the mobile communication system of Embodiment 5 will be described below.

In Embodiment 5, the case will be described in which since a mobile station 16 moves from a radio-covered area 24a of a base station 24 to a radio-covered area 23a of a base station 23, hand-over of a mobile station 16 is carried out.

First, when a hand-over request is made by the mobile station 16 or the base station 24 (ST11), a mobile switching center 27 detects electric field strength of radio waves transmitted from all the base stations 23 and 25 adjacent to the base station 24 currently connected to the mobile station 16 and instructs the mobile station 16 to send the electric field strength to the mobile switching center 27 (step ST12).

Subsequently, after the mobile switching center 27 receives the electric field strength of radio waves transmitted from the base stations 23 and 25 adjacent to the mobile station 16 from the mobile station 16, the mobile switching center 27 compares the electric field strength with one another to determine that the base station which transmitted a radio wave of the maximum electric field strength is made to be a switched base station (step ST13). However, for the explanatory convenience, it is assumed that the base station 23 be a switched base station.

After the switched base station is determined, a system setting processor 38 of the mobile switching center 27 refers to the contents stored in a mobile station information memory 35 to select a data communication channel in which the maximum transmission rate can be achieved in a range of the maximum transmission rates to be handled by the mobile station 16 from among free data communication channels of the base station 23 (step ST 14).

The system setting processor compares the transmission rate before switching with the transmission rate after switching (step ST15). When the transmission rate after switching is higher than the transmission rate before switching, the system setting processor performs hand-over of the mobile station 16 before the transmission rate is switched in order to perform the hand-over of the mobile station 16, as shown in FIG. 11 (P54). In addition, the case will be described in Embodiment 6, in which the transmission rate before switching is higher than the transmission rate after switching.

In such way, after the hand-over of the mobile station 16 is performed, the system setting processor 38 checks for free data communication channels again, and then selects the data communication channel in the same method and sends information on the maximum transmission rate to the base station 23 and the mobile station 16 (P55, P56).

Moreover, after the mobile switching center 27 sends the maximum transmission rate to the base station 23 and the mobile station 16, the mobile switching center 27 counts time from the time of a starting point at which the information on the maximum transmission rate has been sent. When the time has reached the rate switching time stored in the mobile station information memory 35, the mobile switching center 27 sends the switching timing information to the base station 23 and the mobile station 16 (P58, P59).

When the mobile switching center 27 has sent the switching timing information to the base station 23 and the mobile station 16, the base station 23 and the mobile station 16 start transmission/reception of communication data at the transmission rate according to the information on the earlier sent maximum transmission rate (P60, P61).

As described above, according to Embodiment 5, since the mobile switching center 27 is designed to select the data communication channel in which the maximum transmission rate can be achieved in a range of the maximum transmission rates to be handled by the mobile station 16, the transmission rate of communication data can be optimized each time the hand-over of the mobile station 16 is performed.

Moreover, when the transmission rate is increased by performing the hand-over of the mobile station 16, the hand-over of the mobile station 16 is performed before the transmission rate is changed. Therefore, the hand-over of the mobile station 16 can be carried out promptly.

Embodiment 6

In Embodiment 5, the case is described in which the transmission rate is increased by performing the hand-over. However, when the transmission rate is decreased by performing the hand-over, the hand-over may be performed after the transmission rate is changed.

In such way, disconnection of radio-connection caused due to the hand-over of the mobile station 16 can be prevented.

Embodiment 7

Figure 14:
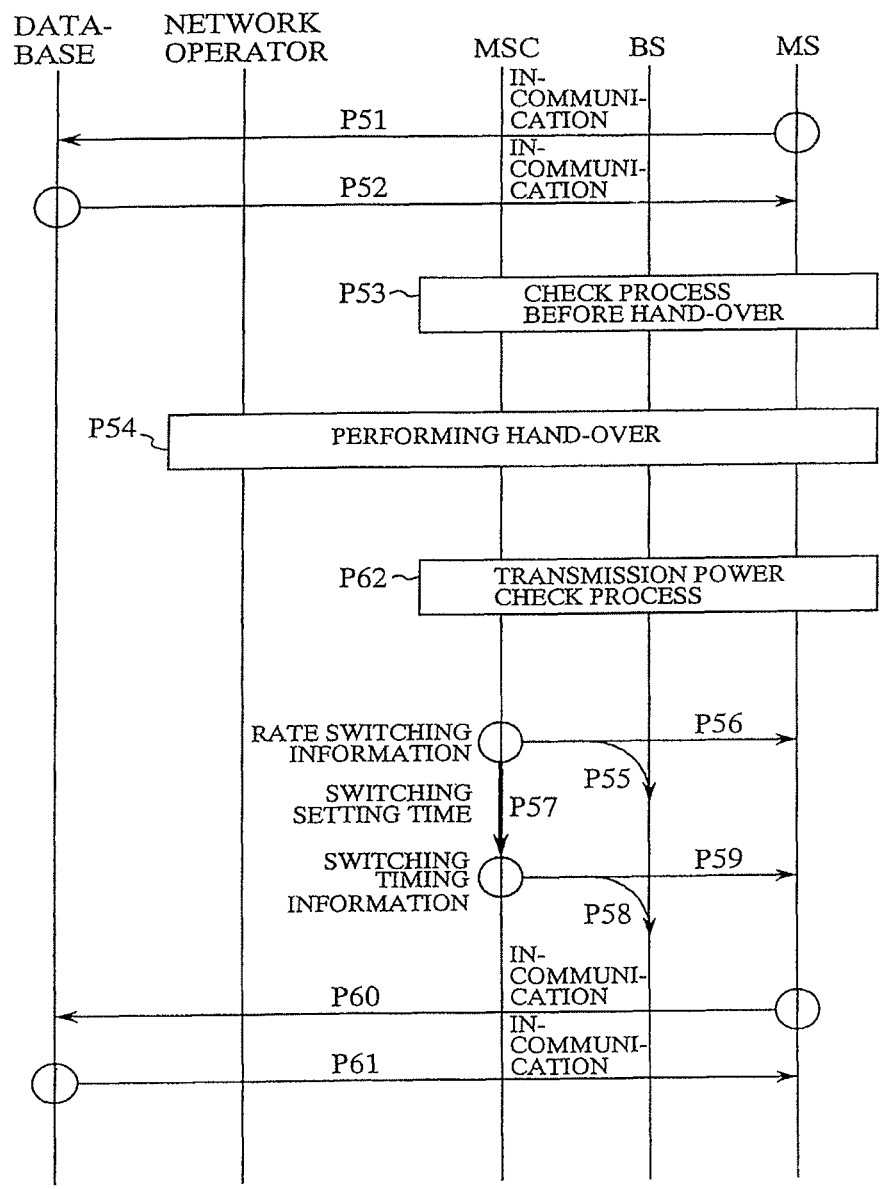
FIG. 14 is a flow chart explaining a mobile communication system of Embodiment 6 according to the present invention.

FIG. 14 is a transmission flow chart showing a mobile communication system of Embodiment 7 according to the present invention, and FIG. 15 is a flow chart showing the check process of transmission power.

An operation of the mobile communication system of Embodiment 7 will be described below.

In Embodiment 5, the mobile communication system is described in which the transmission rate is changed immediately after the hand-over is performed For example, since transmission power of a transmission side apparatus needs to be doubled (dB value is increased by 3 dB) in order to increase the transmission rate, the transmission power may be checked for after the hand-over is performed as shown in FIG. 14.

For example, while transmission/reception of communication data is performed between the mobile station 16 and the base station 23 (step ST21), the mobile switching center 27 judges if there is a free data communication channel with a transmission rate higher than the transmission rate in current use in a cell with which the mobile switching center 27 communicates at present or not (step ST22).

When there is no free data communication channel, the mobile switching center 27 terminates this process. When there is a free data communication channel in the cell to the contrary (step ST23), the mobile switching center 27 judges if the mobile station 16 and the database 11 can perform data communication of a transmission rate higher than the transmission rate in current use by referring the mobile station information memory 35 and so on (step ST24).

When the mobile switching center 27 judges that faster data communication can be performed, the mobile switching center 27 judges if there is extra transmission power or not by checking transmission power of the base station 23 by checking received power of the mobile station 16 in the case that the mobile station 16 receives communication data (step ST24).

On the other hand, when the base station 23 receives communication data, the mobile switching center 27 judges if there is extra transmission power or not by checking transmission power of the mobile station 16 by checking received power of the base station 23 (step ST24).

When judging that there is extra transmission power (step ST27), the mobile switching center 27 immediately performs switching of the transmission rate (step ST28). On the contrary, when judging that there is no extra transmission power (step ST27), the mobile switching center 27 instructs the mobile station 16 (or base station 23) of a transmission side to increase the transmission power level and instructs the base station 23 (or mobile station 16) of a reception side to send received power to the mobile switching center 27.

Thus, the mobile switching center 27 judges if extra transmission power available for the changed transmission rate is secured by increasing received power or not. Only when the extra transmission power is secured, the mobile switching center 27 performs switching of the transmission rate. When the extra transmission power is not secured to the contrary, the mobile switching center 27 stops switching of the transmission rate.

As described above, in Embodiment 7, when the transmission power corresponding to the changed transmission rate is secured, the mobile switching center 27 allows the change of the transmission rate. On the contrary, when the transmission power corresponding to the changed transmission rate is not secured, the mobile switching center 27 disallows the change of the transmission rate. When the transmission rate cannot be increased, the useless process of increasing the transmission rate can be prevented from being caused and the communication abnormality caused due to such useless process can be prevented from being caused.

INDUSTRIAL APPLICABILITY OF THE INVENTION

As described above, in a mobile communication system of the present invention, when an asymmetrical data communication channel is set in which a transmission rate of communication data transmitted from a mobile station to a database differs a transmission rate-of communication data transmitted from the database to the mobile station, a mobile communication system of the present invention is effective in forming multimedia like radio-communication a data amount of which sometimes varies as time elapses.

What is claimed is:

1. A method for performing radio communication, the method comprising:
   receiving, at a mobile station, transmission rate information;
   receiving a rate switching time; and
   switching, at the rate switching time, a transmission rate associated with the mobile station in accordance with the transmission rate information, wherein the transmission rate is an uplink transmission rate, and the uplink transmission rate is independent of a downlink transmission rate.

2. The method of claim 1, wherein the mobile station performs radio communication in a multi-transmission rate code division multiple access communication system.

3. The method of claim 2, wherein the radio communication is performed using code division multiple access.

4. The method of claim 1, further comprising registering a location.

5. The method of claim 1, wherein the transmission rate is one member of a set of at least three transmission rates.

6. The method of claim 5, further comprising storing the set of transmission rates.

7. The method of claim 5, wherein the set of transmission rates includes a second transmission rate that is twice a first transmission rate.

8. The method of claim 7, wherein the set of transmission rates includes a third transmission rate that is twice the second transmission rate.

9. The method of claim 1, further comprising transmitting a request for changing the transmission rate.

10. The method of claim 1, further comprising transmitting a preliminary transmission using a fixed transmission rate.

11. The method of claim 10, wherein the fixed transmission rate is less than the transmission rate based on the transmission rate information.

12. A mobile station configured to:
    receive transmission rate information;
    receive a rate switching time; and
    switch, at the rate switching time, a transmission rate associated with the mobile station in accordance with the transmission rate information, wherein the transmission rate is an uplink transmission rate, and the uplink transmission rate is independent of a downlink transmission rate.

13. The mobile station of claim 12, wherein the mobile station performs radio communication in a multi-transmission rate code division multiple access communication system.

14. The mobile station of claim 13, wherein the radio communication is performed using code division multiple access.

15. The mobile station of claim 12 further configured to register a location.

16. The mobile station of claim 12, wherein the transmission rate is one member of a set of at least three transmission rates.

17. The mobile station of claim 16 further configured to store the set of transmission rates.

18. The mobile station of claim 16, wherein the set of transmission rates includes a second transmission rate that is twice a first transmission rate.

19. The mobile station of claim 18, wherein the set of transmission rates includes a third transmission rate that is twice the second transmission rate.

20. The mobile station of claim 12 further configured to transmit a request for changing the transmission rate.

21. The mobile station of claim 12 further configured to transmit a preliminary transmission using a fixed transmission rate.

22. The mobile station of claim 21, wherein the fixed transmission rate is less than the transmission rate based on the transmission rate information.

23. A mobile station for performing radio communication with a communication control system, the mobile station configured to:
   receive transmission rate information from the communication control system;
   receive a rate switching time from the communication control system; and
   switch, at the rate switching time, a transmission rate of the mobile station in accordance with the transmission rate information, wherein the transmission rate is an uplink transmission rate, and the uplink transmission rate is independent of a downlink transmission rate.

24. The mobile station according to claim 23, wherein the mobile station belongs to a radio covered area of a base station, for performing radio communication to the base station.

25. A method in a mobile station for performing radio communication with a communication control system, the method comprising:
   receiving transmission rate information from the communication control system;
   receiving a rate switching time from the communication control system; and
   switching, at the rate switching time, a transmission rate of the mobile station in accordance with the transmission rate information, wherein the transmission rate is an uplink transmission rate, and the uplink transmission rate is independent of a downlink transmission rate.

26. The method according to claim 25, wherein the mobile station belongs to a radio covered area of a base station, for performing radio communication to the base station.

* * * * *